Apr. 10, 1923.
K. F. HENNEKIN
RELEASE DEVICE FOR TOWING
Filed Mar. 31, 1921
1,451,658
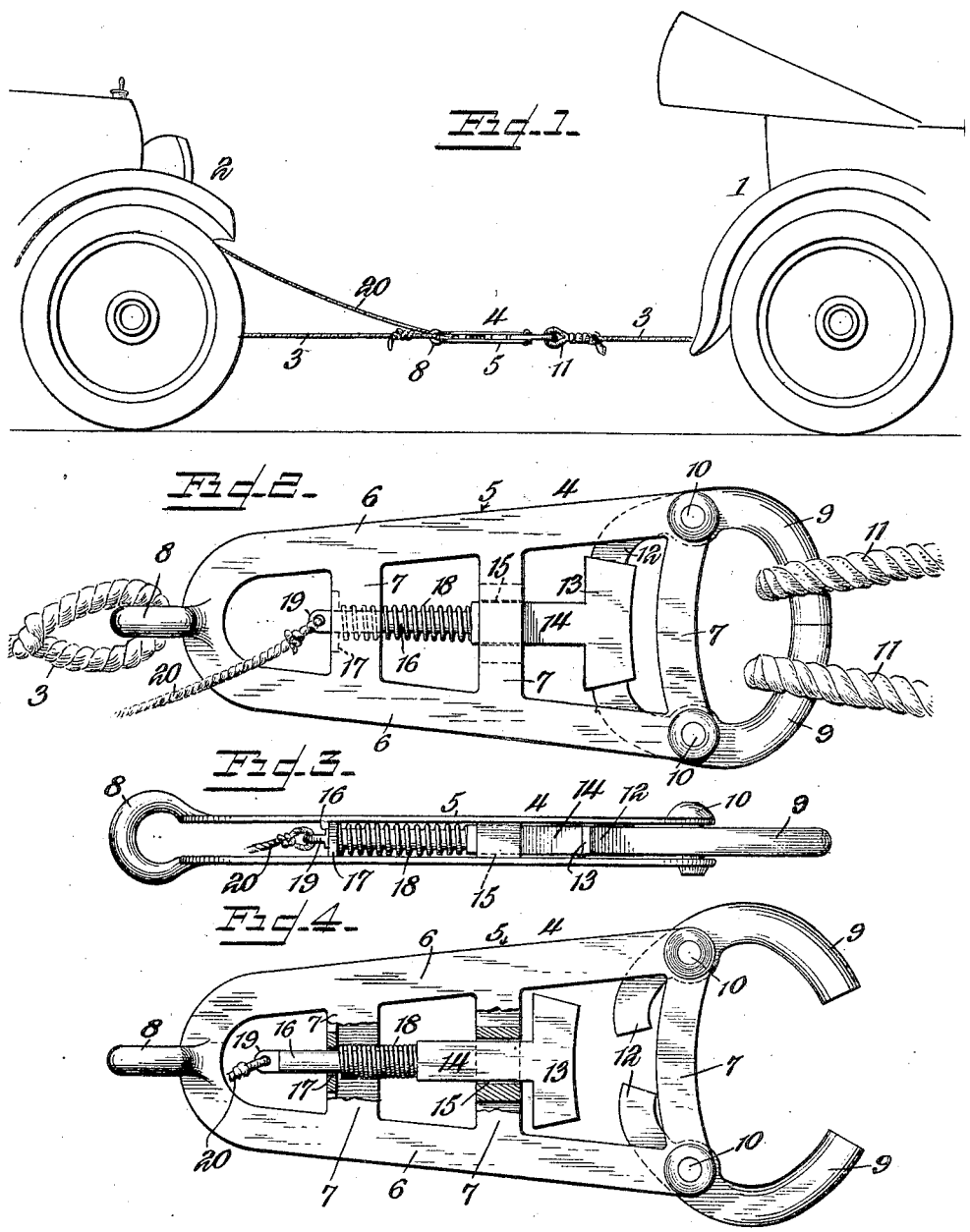
K. Frank Hennekin
INVENTOR Patented Apr. 10, 1923.

1,451,658

UNITED STATES PATENT OFFICE.

KASPAR FRANK HENNEKIN, OF SEASIDE, CALIFORNIA.

RELEASE DEVICE FOR TOWING.

Application filed March 31, 1921. Serial No. 457,285.

*To all whom it may concern:*

Be it known that I, KASPAR FRANK HENNEKIN, a citizen of the United States, residing at Seaside, in the county of Monterey and State of California, have invented new and useful Improvements in Release Devices for Towing, of which the following is a specification.

This invention has reference to release devices for towing, and is designed particularly for introduction in a tow line between a towing automobile and an automobile being towed.

The object of the invention is to provide means whereby the towed machine may be readily released as occasion demands, so that in the event of the towing machine meeting with an accident, the machine being towed may be quickly released and prevented from participating in the accident.

In accordance with the invention, there is provided a device having a release structure controllable from the towed machine and readily manipulated by a person in the towed machine to uncouple the two machines should it appear that the second machine was in danger of meeting with an accident, so that both machines may escape the liability of danger.

The invention will be best understood from a consideration of the following detailed description taken in connection with the accompanying drawing forming part of this specification, with the understanding, however, that the invention is not confined to any strict conformity with the showing of the drawing, but may be changed and modified so long as such changes and modifications mark no material departure from the salient features of the invention as expressed in the appended claims.

In the drawing:

Fig. 1 is a diagrammatic elevation of a towing machine and the machine being towed and joined together by the release device.

Fig. 2 is a plan view of the release device in the coupling position.

Fig. 3 is a side elevation of the release device.

Fig. 4 is a plan view of the release device in the releasing position and showing some parts in section.

Referring to the drawing, there is shown in Fig. 1 a towing automobile 1 and a towed automobile 2 joined by a tow rope 3, in which is interposed a release structure 4, which, however, normally joins the two vehicles. The release structure comprises a frame 5, formed of elongated side members 6, having cross bars 7 joining the side members, which latter may be made in part of channel form for lightness and strength and to accommodate certain structures to be described. At one end the frame terminates in an eye 8 to which the end of the tow rope 3 connected to the machine being towed is made fast. The frame 5 is preferably, though not necessarily, expanded from the eye end 8 to the cross bar 7 and at the corners of the frame 5 where the cross bar 7 joins it, there are two hook-shaped members or arcuate-shaped jaws 9 connected thereto by pivot pins 10. Each hook 9 on one side of the pivot 10 is curved and elongated so that the free extremities of the hooks may be brought together into engagement to receive loops 11 of the portion of the tow rope made fast to the towing machine 1, but which may be readily released from the ends of the hooks 9 when these hooks spread apart about the pivots 10, the curvature of the hooks 9 facilitating such release.

On the other side of the pivots 10, the hooks 9 are provided with continuations 12, which when the free ends of the hooks 9 are brought together to retain the loops 11, are spread apart for a considerable distance and in that condition receive a wedge block 13 holding the free ends of the hooks 9 together with the loops 11 threaded onto the hooks 9. The wedge block 13 is formed with a squared stem 14 guided by a passage 15 in the intermediate cross bar 7, there being three such cross bars in the structure shown. The stem 14 is of square or other cross-sectional formation, so that it may be guided in its movements in a straight line without turning. At the end of the stem 14 remote from the wedge block 13, the stem 14 has a continuation 16 preferably of circular cross section and extending through a guide 17 forming part of the cross bar 7 near the eye end of the frame 5. Between the continuation 14 and the guide 17, the rounded continuation 16 is surrounded by a compression spring 18, abutting at the ends against the continuation 14 and the guide 17. At the outer extremity of the stem continuation 16 is an eye 19 to which there is secured one end of a cord 20, which may be considered as reaching into the automobile 2 in accessible position to a person seated therein.

When the machines are joined for towing, the wedge block 13 is lodged between the adjacent rear ends of the hooks 9 holding the forward ends of these hooks in engagement to confine the loops 11 thereon and with the spring 18 expanded, the hooks 9 are firmly held in locked position. Should it occur that the occupant of the rear vehicle 2 discovers, while the machine 2 is being towed, an impending dangerous condition, such as the stalling of the towing machine on a railroad or the running off of the towing machine from the side of the road, or some other condition which would demand the release of the towed machine, the occupant of the second machine need only pull upon the release line 20 with sufficient force to compress the spring 18 and thus withdraw the wedge block 13 from between the ends 12 of the hooks 9. In such event, the pull of the loops 11 upon the curved forward ends of the hooks 9, will cause the hooks to turn upon the pivots 10, spreading their forward ends freed from the restraining effect of the block 13 to bring about a spreading apart of the forward ends of the hooks and the slipping off therefrom of the loops 11. The towed machine thereupon is wholly and quickly released from the towing machine and any danger which might occur to the towed machine, if permanently held to the towing machine, is obviated. The towing rope 3 may either be a fiber rope or a metal rope and of any desired length, while the frame 5 and parts carried thereby may be of malleable iron or steel, adding but little weight to the structure and providing ample strength.

What is claimed is:—

1. A towing device for automobiles, comprising a frame composed of spaced side members laterally inclined towards each other to form a substantially flat frame having a narrow and a wide end disposed opposite each other, transverse bars joining the side members at spaced points, said frame terminating at its narrow end in a rope-receiving eye, arcuate-shaped jaws pivoted intermediate their ends at the corners of the wide end of the frame, a spring controlled wedge block engaging between the inner ends of the pivoted jaws and slidably mounted in said bars and adapted to lock the outer free ends of the jaws in abutting relation for retaining the loops of a rope attached to a towing machine.

2. A releasing device for a pair of vehicles connected in towing relation by ropes, comprising a frame separate from the vehicles and having an eye at one end adapted to be engaged by one of the ropes attached to one of the vehicles, a pair of hook-shaped jaws each pivotally mounted at an intermediate point of its length on the frame, a spring-actuated block engaging the inner free ends of the hooks for maintaining the outer free ends of said hooks in abutting relation, and forming with the hooks a continuous eye at the other end of the frame to receive an end of the rope secured to the second vehicle, and thereby provide a releasable connection between said rope and the frame, and a third rope leading from the block to the towed vehicle at a point between the two ends of the frame to permit separation of the hooks to break the continuity of the eye and release the rope leading to the second vehicle.

In testimony, that I claim the foregoing as my own, I have hereto affixed my signature.

KASPAR FRANK HENNEKIN.